United States Patent [19]

Feese

[11] 4,171,609
[45] Oct. 23, 1979

[54] METHOD AND APPARATUS FOR MANUFACTURING CABLES AND LINES WITH SZ-TWISTED ELEMENTS

[75] Inventor: Wolfgang Feese, Neustadt, Fed. Rep. of Germany

[73] Assignee: Siemens Aktiengesellschaft, Munich, Fed. Rep. of Germany

[21] Appl. No.: 925,798

[22] Filed: Jul. 18, 1978

[30] Foreign Application Priority Data

Aug. 4, 1977 [DE] Fed. Rep. of Germany ....... 2735476

[51] Int. Cl.² .................. D07B 7/14; H01B 13/24
[52] U.S. Cl. .................................. 57/293; 57/295; 57/296; 118/69
[58] Field of Search ............ 57/3, 6, 7, 34 R, 34 AT, 57/35, 138, 162, 164, 204, 258, 293, 295, 296; 118/69, 45, 56, 107, DIG. 18

[56] References Cited

U.S. PATENT DOCUMENTS

| | | | |
|---|---|---|---|
| 2,904,846 | 9/1959 | Smith | 57/35 X |
| 3,295,163 | 1/1967 | Bachus | 118/69 X |
| 3,412,544 | 11/1968 | Sugi et al. | 57/34 AT |
| 3,604,392 | 9/1971 | Kawazoe et al. | 118/69 X |
| 3,727,895 | 4/1973 | Wondergem | 118/69 X |
| 3,884,025 | 5/1975 | Oberender et al. | 57/293 |
| 3,885,380 | 5/1975 | Hacker | 57/162 |
| 3,889,455 | 6/1975 | Portinari et al. | 57/164 X |
| 3,941,166 | 3/1976 | Maillefer | 57/34 AT X |
| 3,972,304 | 8/1976 | Boucher | 57/296 X |

*Primary Examiner*—Donald Watkins
*Attorney, Agent, or Firm*—Kenyon & Kenyon

[57] ABSTRACT

In the SZ twisting of conductors of electrical cables followed by extrusion of a plastic sheath in the same operation, an untwisting of the reversal points of the twist direction in the area of the cooling section of the extruder is prevented by guiding the extruded sheath immediately behind the extruder in such a manner as to be secured against torsion.

10 Claims, 6 Drawing Figures

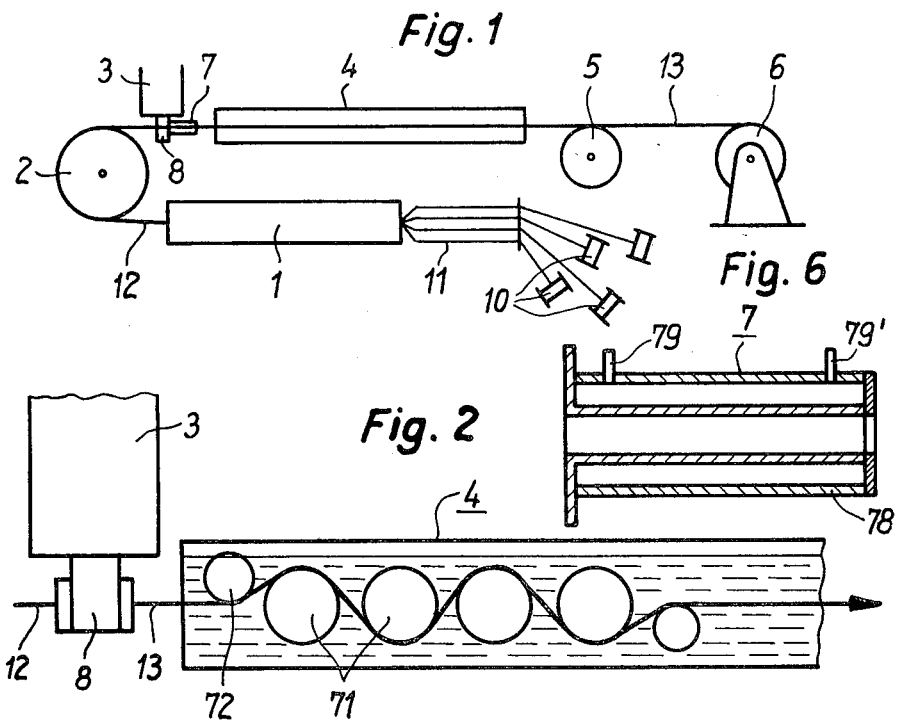
Fig. 1
Fig. 6
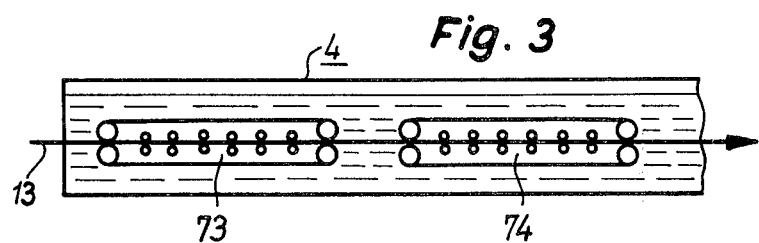
Fig. 2
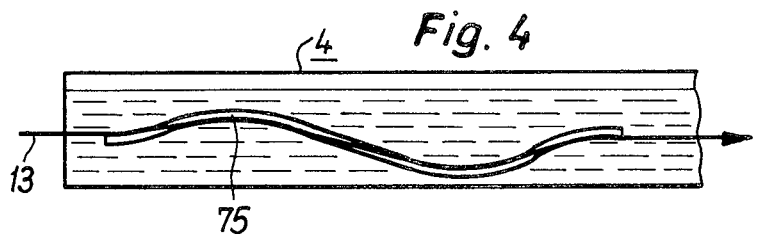
Fig. 3
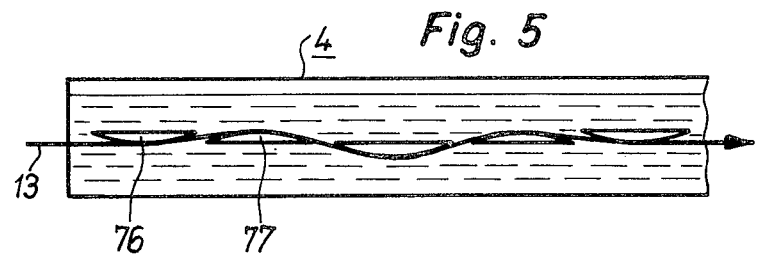
Fig. 4
Fig. 5

METHOD AND APPARATUS FOR MANUFACTURING CABLES AND LINES WITH SZ-TWISTED ELEMENTS

BACKGROUND OF THE INVENTION

This invention relates to the manufacture of cables and flexible power cords constructed from several twisted elements in general and more particularly to an improved method and apparatus for use in a manufacturing method in which immediately before the cable sheath is applied, so-called SZ-twisting, where the elements are twisted alternatingly by sections with right-hand twist and left-hand twist is employed.

Developments in the field of SZ-twisting technology for electrical cables, which got its start at the beginning of the Sixties, has led to SZ-twisting methods and SZ-twisting machines by means of which two to five elements can be twisted together without problems. SZ-twisting is presently used in combined pair, triplet or spiral four (star quad) basic unit stranding of communications cables as well as in stranding, followed by sheathing of multi-conductor, permanently installed power cables with conductor cross sections up to 2.5 mm$^2$ (U.S. Pat. No. 3,823,536). As a rule, the SZ-twisting is done by means of rotating longitudinal accumulators, the rotary motion of which is changed at intervals.

Employment of SZ-twisting is of interest wherever a twisting operation and another operation can be combined. In addition to the aforementioned manufacturing operations, this also applies to the twisting of flexible elements in combination with a further operation, for instance, it applies to the twisting and subsequent sheathing of the conductors of flexible power cords, the conductors of which consist of stranded wire. Such flexible cords are, for instance, telephone cords or connecting cords for household appliances. However, SZ-twisting can also be used in the manufacture of optical cables (optical waveguide cables), for instance, in the twisting and subsequent sheathing of high tensile strength wires or filaments for manufacturing a high tensile strength support member.

The present invention is based on the discovery that it is important, particularly in the case of flexible SZ-twisted cords, that the lay (twist) obtained by the twisting not be reduced by subsequent operations and that the reversal points of the twist direction of the mutually SZ-twisted conductors be made as short as possible, so that the flexibility of the cord is not adversely affected. While in the case of SZ-twisting solid wire conductors, untwisting of the twisted assembly, especially in the vicinity of the reversal points of the twist direction, is prevented by influence of tensile stresses, partly by plastic deformation of the conductors, the opposite effect occurs in the case of flexible conductors made of stranded wire, i.e., the torsional stresses present in the twisted material can equalize particularly well in the vicinity of the reversal points of the twist direction. This takes place particularly where the SZ-twisted material is conducted over a long unsupported distance in air after being twisted, as is necessary, for instance, during a subsequent covering with an extruded plastic sheath in the region of the cooling section (water basin) of the extruding apparatus.

For the SZ-twisting elements of electrical cables, equipment is known in which rotating twisting heads cooperate with stationary twisting heads and the frictional connection of the stationary twisting heads is changed at intervals. The stationary twisting heads form so-called torsion blocks, since in the closed condition, they prevent the torsion of the material to be twisted, starting from the rotating twisting head, from affecting sections of the material which are located beyond the stationary twisting head. Such torsion blocks are also known in SZ-pretorsioning of conductors.

SUMMARY OF THE INVENTION

It is an object of the present invention to improve the known method, for manufacturing cables with an extruded plastic sheath, in which elements to be twisted, fed from stationary supplies, are first SZ-twisted together and in which the SZ-twisted elements are sheathed immediately thereafter in the same operation; the sheathing is cooled and the sheathed twisted elements are wound up, in such a manner that the twist of the elements obtained by the SZ-twisting operation is substantially retained in the course of the further manufacturing process and that relatively short reversal points of the twist direction are obtained in the finished product. Such operation improves the efficiency of the combined SZ-twisting and sheathing operation and its use in the manufacture of cables with flexible twisted elements, e.g., in the manufacture of cables with conductors containing stranded wires becomes also possible.

According to the present invention, to solve this problem, forces which prevent torsional movement of the sheath are caused to act on the latter during the initial phase of cooling the sheath.

The present invention takes into account the discovery that in the SZ-twisting and subsequent sheathing of elements to be twisted, especially of flexible elements, the latter have a tendency to untwist completely, under the influence of torsion stresses, behind the extruder, where they are conducted over a long distance freely through the air or through the water cooling basin of the extruder, while the torsion originally present in the SZ-twisted elements is transmitted into the still warm plastic sheath and, after cooling down, causes a permanent SZ torsion of the sheath. Through the measure according to the present invention, however, torsion of the extruded plastic sheath and thus, untwisting of the SZ-twisted elements is prevented. Consideration is given to the fact that the outer layer of the sheath of extruded plastic, as a rule, solidifies so fast that, even at a short distance from the mouthpiece of the extruder, sufficiently large forces can be transmitted to the plastic sheath without deformation of or damage to the sheath.

To supply the forces provided according to the present invention, which are effective in the circumferential direction of the sheathed twisted elements, apparatus which comprises, after an extruder, a cooling basin for cooling down the sheath and in which, in a further embodiment of the invention, there are arranged immediately behind the mouthpiece of the extruder and/or in the forward region of the cooling basin, one or more feedthroughs which are in full or partial contact with the sheath of the twisted elements in the circumferential direction and are fixed in the circumferential direction of the sheath is particularly well suited.

Such feedthroughs act as a torsion block or torsion brake, i.e., they prevent rotary movement of the plastic sheath applied by means of the extruder and at the same time thereby prevent a loss of twist of the SZ-twisted conductors.

The feedthroughs acting as torsion blocks can be designed in various ways. For instance, a feedthrough which consists of a section of pipe arranged immediately behind the mouthpiece of the extruder is suitable. The dimension of the inside diameter of this pipe section is selected so that the extruded sheath slides along the surface of the pipe. It is advantageous if the pipe is water cooled, to effect, at the same time, a cooling down of the outer layers of the extruded sheath.

Other practical embodiments of the feedthroughs take into consideration an initially occurring solidification of the outer zones of the extruded plastic sheath and can therefore engage the plastic sheath with greater force. For this purpose, they are arranged in the forward region of the cooling basin associated with the extruder and consist, for instance, of caterpillar tracks, a wavy tubular guide or runners arranged in tandem, or of several deflection rolls arranged in tandem, between which the sheathed twisted elements run in wavy fashion. All the stationary torsion blocks mentioned grab the sheathed, SZ twisted elements in the circumferential direction with friction pressure without appreciably impeding the longitudinal movement of the twisted material in the pull off direction, and in this manner block torsional equalization movements of the SZ-twisted elements about the twisting axis within the cooling section of the extruded sheath. These torsion blocks are advantageously fastened to the side walls of the cooling basin.

The feedthroughs which prevent a torsional equalization movement of the SZ-twisted elements, should be arranged as close as possible to the extruder, i.e., in the entrance region of the respective cooling section. The entrance region of the cooling section is understood here to be that region in which the plastic sheath in cooled down to the extent that it is no longer plastically deformable, after leaving this region, or only inappreciably so, by torsion forces which are caused by torques resulting from the axially stressed SZ-twisted assembly.

Since the natural tendency of the SZ-twisted elements to untwist results from the tensile stresses exerted on the elements to be twisted during the manufacturing process, the effect of the feedthroughs provided under the scope of the present invention for preventing torsional movements of the extruded plastic sheath can be improved by keeping the tensile stresses acting on the SZ-twisted material as small as possible. According to a further embodiment of the present invention, an additional pulling device which is arranged immediately ahead of the extruder for the SZ-twisted elements, supplementing the pulling device arranged after the cooling basin for the sheathed twisted elements is suitable for this purpose. It is thereby achieved that, in the entrance region of the cooling sections, only those longitudinal forces which are necessary for transporting the twisted, sheathed material in the region of the cooling section, act on the SZ-twisted elements and not also the forces required for pulling the elements to be twisted off the stationary conductor supplies. The additional pulling device may consist of a caterpillar track known per se or a pulling sheave. A resiliently ("softly") driven deflection pulley, around which the SZ-twisted elements are looped over approximately 180° has been found particularly advantageous.

BRIEF DESCRIPTION OF THE DRAWINGS

FIG. 1 is a schematic illustration of a apparatus according to the present invention.

FIGS. 2–5 are illustration of various embodiments of feedthroughs which can be disposed at the entrance to the cooling basin.

FIG. 6 is a cross section view of the water cooled tubular feedthrough of FIG. 1.

DETAILED DESCRIPTION OF THE INVENTION

FIG. 1 shows production apparatus, by means of which four conductors containing flexible stranded wire are processed into an electrical cable. For this purpose, the production apparatus includes stationary conductor supplies 10 from which conductors 11 run into SZ-twisting equipment 1 and are there twisted with twist directions alternating by sections to form an SZ-twisted group 12. An auxiliary pulling device 2 which consists of a softly driven deflection pulley, around which the SZ-twisted conductors are looped over 180° is arranged after the SZ-twisting equipment 1. The extruder 3, by means of which a plastic sheath 13 is applied over the SZ-twisted conductors is arranged immediately adjacent device C. This plastic sheath 13 is cooled off in the adjacently arranged water cooling basin 4, and the sheathed conductors are pulled off by means of the main pulling device 5 and wound on a stationary take-up stand 6.

In order to prevent equalization movements of the SZ-twisted conductors, as intended by the present invention, there is arranged, immediately behind the extrusion head 8 of the extruder, a tubular feedthrough 7 matched to the outside diameter of the extruded sheath. The tubular feedthrough 7, which prevents torsional movements of the extruded plastic sheath in the region of the water cooling basin 4, is water cooled, for instance, by means of an additional water carrying jacket 78, which has water inlet and outlet stubs 79 and 79' as shown by FIG. 6.

In lieu of the tubular feedthrough 7 shown in FIG. 1, other feedthroughs can also be considered. These are advantageously arranged within the cooling basin 4, more specifically, in the entrance region of the cooling section. Suitable for this purpose is, for instance, the roll arrangement shown in FIG. 2, which consists of several rolls 71 and 72 which are arranged one behind the other and between which the sheathed conductors run in wavy fashion. The sheathed conductors can be looped around the rolls 71 partially or completely. The profile of the rolls is advantageously fitted to the shape of the cross section of the sheathed cable, so that the transversal forces become effective over the largest possible area. To achieve transversal loading of the extruded plastic sheath with as much rotational symmetry as possible, the rolls 71 are allowed to act on opposite sides of the extruded plastic sheath.

In the embodiment shown in FIG. 3, the feedthrough consists of caterpillar tracks 73 and 74, of a type well known in the art. These caterpillar tracks 73 ad 74 can also be arraned so as to be shifted in the circumferential direction of the sheathed conductors relative to each other. A further embodiment of a feedthrough, by which forces can be exerted on the sheathed conductors in the circumferential direction is shown in FIG. 4. In this embodiment the feedthrough 75 consists of a tube bent in a wavy shape, through which the sheathed conductors run. In order to obtain a cooling effect inside this tube, the latter advantageously has holes or is made in the form of a grid.

A particularly simple embodiment of a feedthrough according to the invention is shown in FIG. 5. It consists of several runners 76 and 77 arranged in tandem, by means of which the sheathed conductors are deflected laterally. The lateral deflection transforms longitudinal forces into transversal forces.

What is claimed is:

1. In a method for the manufacture of cables with an extruded plastic sheath which are constructed from several twisted elements, where the twisted elements running off from stationary supplies are first SZ-twisted together and in which the SZ-twisted elements are sheathed immediately thereafter in the same operation; the sheath is cooled off; and the sheathed twisted elements wound up, the improvement comprising applying forces which prevent torsional movement of the sheath to the sheath during the beginning phase of the cooling of the sheath.

2. In apparatus for the S-Z twisting of wires or stranding elements including SZ twisting apparatus, means to supply wires to the twisting apparatus and an extruder for applying a sheath to the S-Z twisted wires with a mouthpiece from which the wires with the sheath thereon exit the improvement comprising at least one feed-through device at least in partial circumferential contact with the sheath to prevent twisting thereof, disposed at least shortly after the extruder and secured against movement in the circumferential direction of the sheath.

3. The improvement according to claim 2, wherein said feedthrough comprises a section of pipe arranged immediately behind the mouthpiece of the extruder.

4. The improvement according to claim 3, wherein said pipe section is water cooled.

5. The improvement according to claim 2 wherein said apparatus further includes a cooling basin arranged after said extruder and wherein said feedthrough is disposed in the entrance section of said cooling basin.

6. The improvement according to claim 5 wherein said at least one feedthrough comprises caterpillar tracks arranged in the forward region of the cooling basin.

7. The improvement to claim 5, wherein said at least one feedthrough comprises a wavy shaped tubular guide.

8. The improvement according to claim 5 wherein said at least one feedthrough comprises runners arranged in tandem, spaced from each other, through which the sheath and conductors are led in a wavy path with a lateral deflection which thereby transforms longitudinal forces into tranvsersal forces.

9. The improvement according to claim 5, wherein said at least one feedthrough comprises several rolls which are arranged one behind the other and between which the sheathed twisted elements run in wavy fashion.

10. The improvement according to claim 2 wherein said apparatus includes a pulling device for the sheathed twisted elements following the cooling basin and further including an additional pulling device for the SZ-twisted elements disposed immediately ahead of the extruder.

* * * * *